United States Patent
Nohra et al.

(10) Patent No.: US 9,948,348 B2
(45) Date of Patent: Apr. 17, 2018

(54) HIGH ISOLATION SWITCH WITH NOTCH FILTER

(75) Inventors: George Nohra, Woburn, MA (US); Steven C. Sprinkle, Hampstead, NH (US)

(73) Assignee: SKYWORKS SOLUTIONS, INC., Woburn, MA (US)

( * ) Notice: Subject to any disclaimer, the term of this patent is extended or adjusted under 35 U.S.C. 154(b) by 1430 days.

(21) Appl. No.: 12/787,901

(22) Filed: May 26, 2010

(65) Prior Publication Data

US 2011/0294443 A1 Dec. 1, 2011

(51) Int. Cl.
*H04B 1/44* (2006.01)
*H04B 1/48* (2006.01)

(52) U.S. Cl.
CPC ..................... *H04B 1/48* (2013.01)

(58) Field of Classification Search
USPC ....... 455/78, 73, 127.1; 330/127, 296, 124 R
See application file for complete search history.

(56) References Cited

U.S. PATENT DOCUMENTS

| | | | | |
|---|---|---|---|---|
| 3,680,011 A * | 7/1972 | Adams et al. | ................ | 333/167 |
| 4,034,936 A * | 7/1977 | Eriksson et al. | ............ | 244/3.15 |
| 6,400,963 B1 * | 6/2002 | Glockler et al. | ........... | 455/553.1 |
| 6,657,518 B1 * | 12/2003 | Weller et al. | .................. | 333/204 |
| 2002/0047757 A1 * | 4/2002 | Manku et al. | ................ | 333/170 |
| 2004/0248614 A1 * | 12/2004 | Ella | ............................ | 455/552.1 |
| 2005/0219010 A1 * | 10/2005 | Erb | ................ | 333/126 |
| 2006/0079194 A1 * | 4/2006 | Tired et al. | .................... | 455/283 |
| 2006/0194550 A1 * | 8/2006 | Block et al. | .................... | 455/78 |
| 2006/0229035 A1 * | 10/2006 | Fukamachi et al. | ........ | 455/114.1 |
| 2007/0024400 A1 * | 2/2007 | Subramanyam et al. | ..... | 333/205 |
| 2008/0166980 A1 * | 7/2008 | Fukamachi et al. | ............ | 455/83 |
| 2008/0224792 A1 | 9/2008 | Staal | | |
| 2009/0295502 A1 * | 12/2009 | Ninan et al. | .................. | 333/174 |
| 2010/0066615 A1 * | 3/2010 | Okayama et al. | ............ | 343/702 |
| 2010/0099368 A1 | 4/2010 | Mehmet et al. | | |
| 2011/0200203 A1 * | 8/2011 | Chu | ............................... | 381/74 |
| 2011/0204723 A1 * | 8/2011 | Irish | .............................. | 307/104 |
| 2011/0217926 A1 * | 9/2011 | Low et al. | .................. | 455/41.1 |

FOREIGN PATENT DOCUMENTS

| | | |
|---|---|---|
| EP | 1443666 A2 | 8/2004 |
| JP | 2006295375 A | 10/2006 |
| WO | 2000046929 A1 | 8/2000 |

OTHER PUBLICATIONS

International Search Report and Written Opinion from corresponding International Application No. PCT/US2011/031898 dated Jul. 1, 2011.

* cited by examiner

*Primary Examiner* — Nay A Maung
*Assistant Examiner* — Erica Fleming-Hall
(74) *Attorney, Agent, or Firm* — Lando & Anastasi, LLP

(57) ABSTRACT

A switching method and apparatus that provides high isolation between circuit arms of a mobile communication device by attenuating noise over a defined frequency range using a switched shunt LC notch filter.

25 Claims, 8 Drawing Sheets

HIGH ISOLATION SWITCH WITH NOTCH FILTER

BACKGROUND

1. Field of Invention

The present invention relates generally to mobile communication devices. More particularly, at least one embodiment of the invention relates to high isolation switches for use in mobile communication devices.

2. Discussion of Related Art

Mobile communication devices, such as cellular phones, two-way radios, etc., having a transceiver for transmitting and receiving communication signals generally include a radio frequency (RF) switch to switch the antenna between a receive path and a transmit path. In addition, RF switches can be used to provide operation of the device in more than one frequency band. For example, multiple different communication standards, such as the Global System for Mobile (GSM) communication standard (utilized frequently in Europe and Asia) and the Code Division Multiple Access (CDMA) communication standard (utilized frequently in the United States) exist for cellular phone use, and these different standards require operation in different frequency bands. There is a growing demand for cellular phones and other mobile communication devices to be compatible with more than one communication standard. Therefore many devices include separate circuits to accommodate different communication standards, and use an RF switch to selectively alternate between the different circuits to operate the device in a desired mode.

These RF switches are generally located in close proximity to the antenna of the communication device. Accordingly, high isolation switches are desired as it is important to limit noise leakage and/or harmonic interference between the transmit and receive paths, or between different transmit or different receive paths in the device. In addition, it is desirable that the switch have low loss associated therewith to reduce power consumption and preserve battery life in a mobile device. Furthermore, because mobile communication devices are typically small, the components are located in very close proximity to one another, making electronic isolation, and therefore noise reduction, more important since there may be little isolation resulting from physical separation of the components. Furthermore, because many mobile communication devices are generally low power devices, even a relatively low level of noise may result in power loss that negatively impacts the performance of the device, and therefore good isolation between components is desirable.

SUMMARY OF INVENTION

An RF switch that provides high isolation between circuit arms while maintaining linearity and limiting noise, interference and power loss between circuit arms is desired. Accordingly, aspects and embodiments are directed to a switching method and apparatus that is compact, efficient and which provides very high isolation between circuit arms of a mobile communication device using a switched shunt LC notch filter. Using an LC notch filter with a relatively low number of components in a high isolation switch may allow the switch to limit noise, interference, and power loss between circuit components while maintaining good linearity across the desired operating frequency ranges, as discussed further below. Additionally, by utilizing a high-integration, well developed technology such as CMOS, the size of the high isolation switch may be kept relatively small. Furthermore, by allowing a user to tune the level of attenuation of the LC notch filter by adjusting the value of one component, as also discussed below, the high isolation switch may be easily configurable responsive to the needs of the user.

According to one embodiment, a high isolation radio frequency (RF) switch comprises an input, an output, a switching circuit coupled in series between the input and the output, the switching circuit configured to selectively couple the input to the output responsive to a control signal, at least one shunt circuit coupled between the input and a ground, and at least one LC notch filter switchably coupled to the input in a shunt configuration. The at least one LC notch filter comprises a series combination of a switch, at least one capacitor and at least one inductor, and is configured to attenuate signals within a stop band range of frequencies determined by a value of the at least one capacitor and a value of the at least one inductor.

In one example of the high isolation RF switch the at least one capacitor is connected in series between the switch and the input, and wherein the at least one inductor is connected in series between the switch and ground. In another example, the switch of the at least one LC notch filter comprises a plurality of series connected transistors. The switching circuit may comprise, for example, at least one transistor coupled in series between the input and the output, the at least one transistor configured to selectively couple the input to the output responsive to the control signal. In one example in which the high isolation RF switch is an absorptive switch, the switch further comprises a termination circuit selectively coupled in series between the input and the switching circuit. The termination circuit may comprise, for example, at least one resistor and at least one transistor, and may be configured to selectively couple the resistor into and out of connection between the input and the switching circuit. In one example, the shunt circuit comprises at least one transistor coupled in series between the input and ground, wherein the at least one transistor is configured to selectively couple the input to ground responsive to a shunt control signal. In one example, the at least one inductor includes at least one bondwire inductor. In another example, the at least one capacitor includes one of a variable capacitor and a switchable bank of capacitors. In another example, the value of the at least one capacitor and the value of the at least one inductor are matched.

According to another embodiment, a radio frequency (RF) device comprises a first RF transmission line, a second RF transmission line, an output, a first switching arm coupled between the output and the first RF transmission line, the first switching arm configured to selectively couple the first RF transmission line to the output for a first mode of operation of the RF device, and a second switching arm coupled between the output and the second RF transmission line, the second switching circuit configured to selectively couple the second RF transmission line to the output for a second mode of operation of the RF device. The RF device further comprises a first LC notch filter switchably coupled to the first switching arm in a shunt configuration, the first LC notch filter comprising a series combination of a first capacitor, a first inductor, and at least one first transistor. The at least one first transistor is configured to activate the first LC notch filter in the second mode of operation of the RF device. The first LC notch filter is configured to attenuate signals within a first range of frequencies determined by a value of the first capacitor and a value of the first inductor, the first range of frequencies being selected to include noise frequencies in the first switching arm during the second mode of operation of the RF device.

In one example, the RF device further comprises at least one shunt circuit coupled between the first RF transmission line and ground. The at least one shunt circuit may comprise, for example, at least one transistor coupled in series between the first RF transmission line and ground, wherein the at least one transistor is configured to couple the first RF transmission line to ground in the second mode of operation of the RF device, responsive to a control signal. In one example, the first inductor includes at least one bondwire inductor. In another example, the first capacitor includes one of a variable capacitor and a switchable bank of capacitors. In another example, the value of the first capacitor and the value of the first inductor are matched. In another example in which the first switching arm is an absorptive switching arm, the RF device further comprises a termination circuit selectively coupled in series between the first RF transmission line and the first switching arm. The RF device may further comprise a second LC notch filter switchably coupled to the second switching arm in a shunt configuration, the second LC notch filter comprising a series combination of a second capacitor, a second inductor, and at least one second transistor, wherein the at least one second transistor configured to activate the second LC notch filter in the first mode of operation of the RF device. In one example, the second LC notch filter is configured to attenuate signals within a second range of frequencies determined by a value of the second capacitor and a value of the second inductor, the second range of frequencies being selected to include noise frequencies in the second switching arm during the first mode of operation of the RF device. In another example, the first RF transmission line is configured to transmit signals to the output, via the first switching circuit, in the first mode of operation of the RF device, and the second RF transmission line is configured to receive signals from the output, via the second switching circuit, in the second mode of operation of the RF device. In one example, the first RF transmission line is configured to carry GSM signals in the first mode of operation of the RF device, and the second RF transmission line is configured to carry CDMA signals in the second mode of operation of the RF device.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every drawing. The figures are provided for the purposes of illustration and explanation and are not intended as a definition of the limits of the invention. In the figures:

DETAILED DESCRIPTION

Aspects and embodiments are directed to a switching method and apparatus to provide high isolation (e.g. in excess of 40 dB) between circuit arms of a mobile communication device by specifically attenuating noise over a defined frequency range using an LC notch filter. Because of the relatively small number of components needed to implement the LC notch filter, the high isolation switch may be able to limit noise, interference and power loss between circuit arms while maintaining good linearity and a small circuit footprint. The size of the high isolation switch may also be kept small by utilizing Complementary Metal Oxide Semiconductor (CMOS) technology, for example, to provide a high integrated, relatively inexpensive device. Additionally, the level of attenuation of the LC notch filter may be easily configured by adjusting the value of one or more components of the LC notch filter, as discussed in more detail below. Thus, the high isolation switch may be easily configured to meet the specific needs of a user, providing a flexible, low cost, and high performance solution.

It is to be appreciated that embodiments of the methods and apparatus discussed herein are not limited in application to the details of construction and the arrangement of components set forth in the following description or illustrated in the accompanying figures. The methods and apparatus are capable of implementation in other embodiments and of being practiced or of being carried out in various ways. Examples of specific implementations are provided herein for illustrative purposes only and are not intended to be limiting. In particular, acts, elements, and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1A:
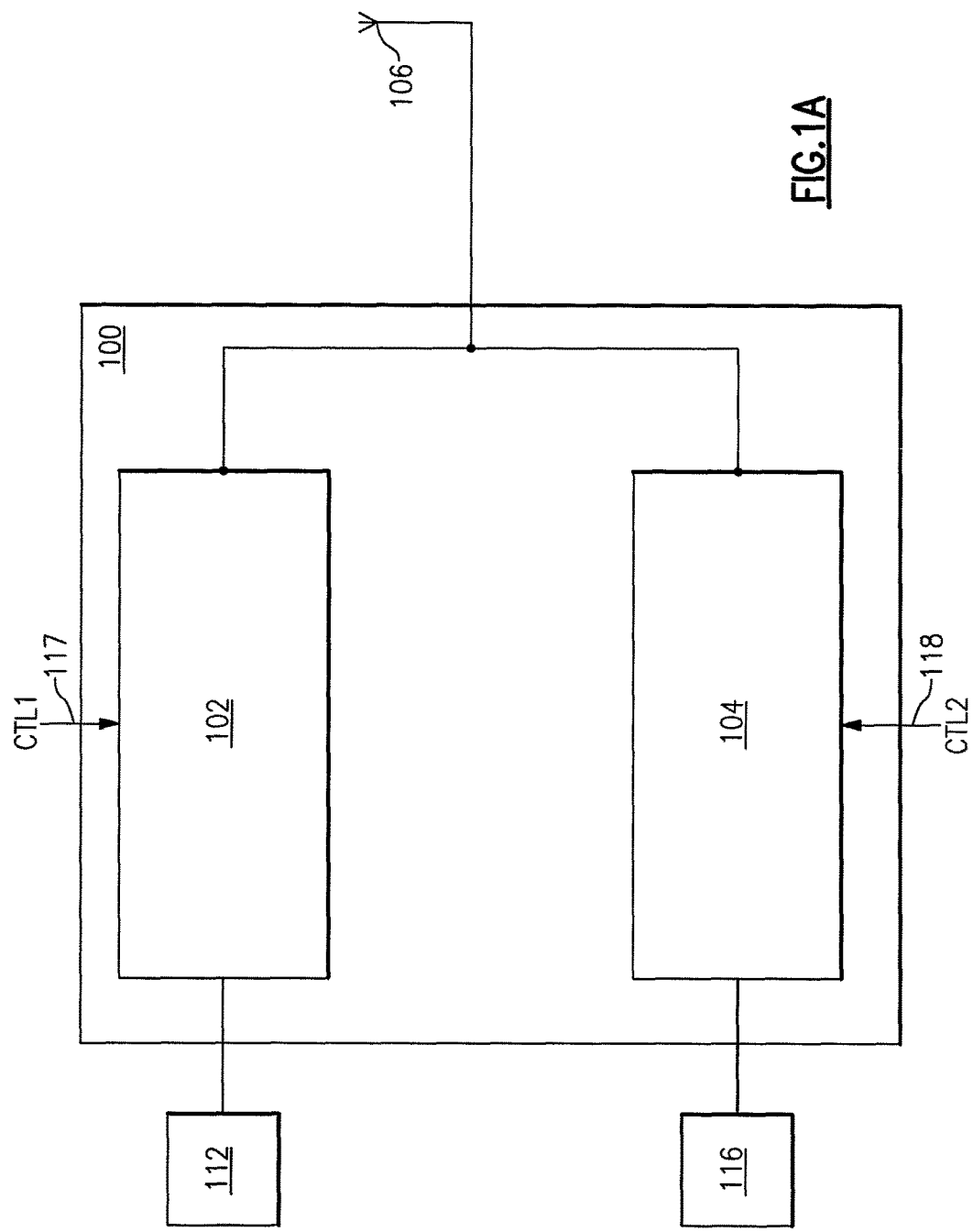
FIG. 1A is a block diagram of one example of a non-absorptive multi-arm RF switch according to aspects of the invention.

Referring to FIG. 1A, there is illustrated a block diagram of one example of a non-absorptive switch 100 which may be used within a mobile communication device to selectively switch between different circuits in a device. For example, the switch may be used to switch between a transmit circuit and a receive circuit, or between different transmit or different receive circuits used for different communications standards. In the illustrated example, the switch 100 is a single pole, double throw (SPDT) switch including a first switching arm 102 and a second switching arm 104 which selectively couple first and second circuits 112, 116, respectively, to an antenna 106. As discussed above, the circuits 112, 116 may be transmit and/or receive circuits, which may be used, for example, to accommodate different frequency bands and/or comply with two different transmissions standards, such as CDMA and GSM which operate in different frequency ranges. Additional examples of transmission standards include Wideband Code Division Multiple Access (WCDMA), Wireless Local Area Network (WLAN), Worldwide Interoperability for Microwave Access (WiMAX), High-Speed Downlink Packet Access (HSDPA), High-Speed Uplink Packet Access (HSUPA) and Long Term Evolution (LTE). Switches such as switch 100 may be used to select between circuits designed for any of these or other transmission standards.

In one embodiment, the switch 100 is configured to activate either the first circuit 112 or the second circuit 116 by selectively coupling either circuit to the antenna 106. Assuming activation of the first circuit 112 is desired, a control signal applied on the first control line 117 will operate the first switching arm 102 to connect the first circuit 112 to the antenna 106, and a control signal over the second control line 118 will operate the second switching arm 104 to decouple the second circuit 116 from the antenna 106 and thereby "deactivate" the second circuit 116. Alternatively, assuming activation of the second circuit 116 is desired, a control signal over the second control line 118 will operate the switching arm 104 to connect the second circuit 116 to the antenna 106 and a control signal over the first control line 117 will operate the switching arm 102 to decouple the first circuit 112 from the antenna 106 and deactivate the first circuit 112.

Figure 1B:
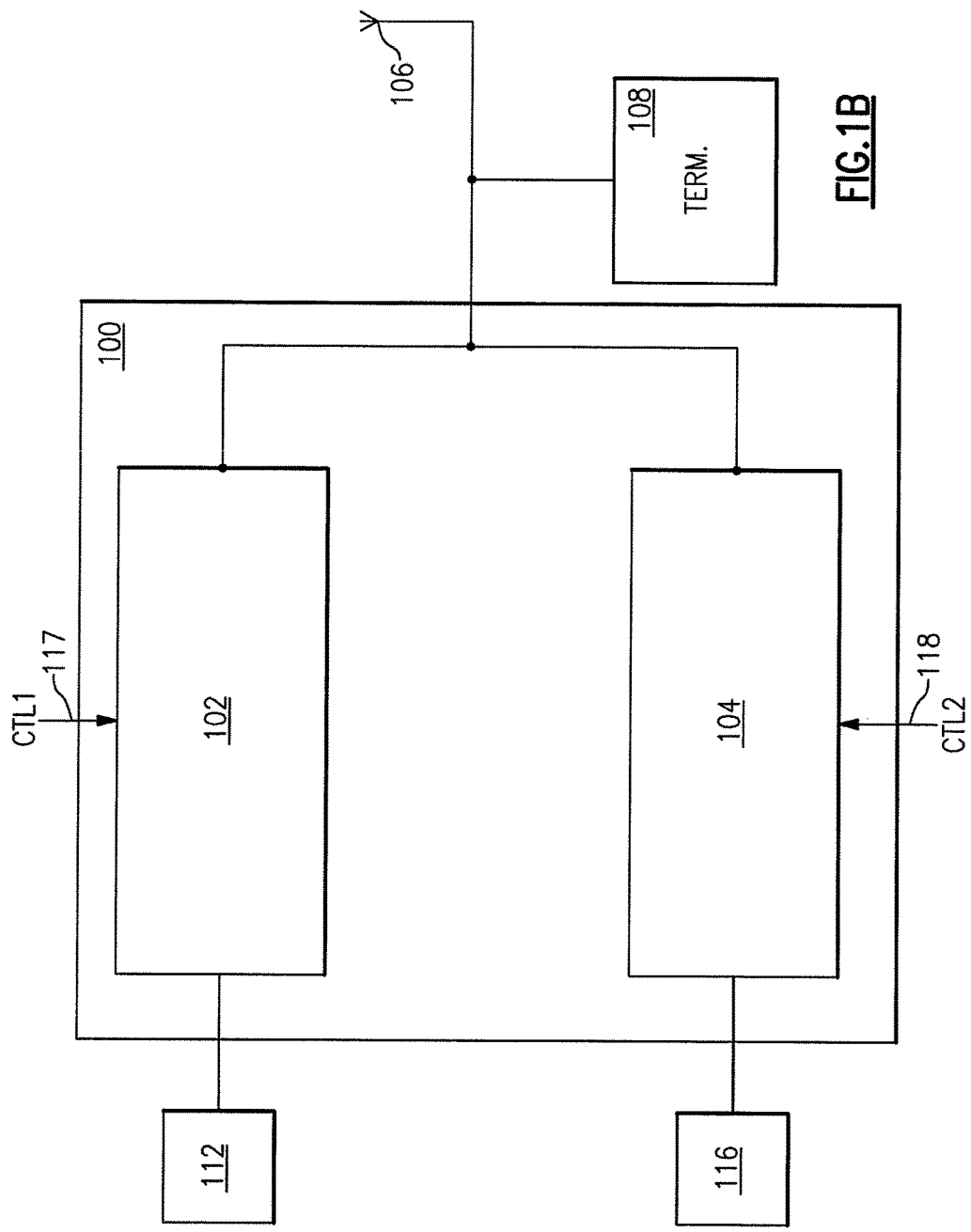
FIG. 1B is a block diagram of one example of an absorptive multi-arm RF switch according to aspects of the invention.

According to another embodiment, the switch 100 may be an absorptive switch. In this example, a termination circuit 108 is coupled to the antenna 106, as illustrated in FIG. 1B. Referring to FIG. 1B, in the illustrated example, the termination circuit 108 is coupled between the switch 100 and the antenna 106 in a shunt configuration. However, according to another embodiment, the termination circuit 108 may be coupled in series between the switch 100 and the antenna 106. The termination circuit 108, controlled by signals on a termination control line (not shown), may be configured to provide line termination at the antenna 106 to reduce noise or interference. In one example, the termination circuit 108 provides a 50 Ohm or 75 Ohm termination. The termination circuit 108 also can include or function as an Electrostatic Discharge (ESD) suppression network.

As discussed above, it may be highly desirable to limit interference between the two circuits 112, 116, and switching arms 102, 104 of the switch 100, and therefore to isolate the first circuit 112 from the second circuit 116. One conventional method of providing isolation between an activated arm (e.g., the first arm 102) and a deactivated arm (e.g., the second arm 104) of the switch 100 includes the use of electrical shunts. An electrical shunt may be added to either circuit arm 102, 104 to redirect unwanted noise to ground before the noise can propagate to other circuit components and create interference. However, particularly depending on the technology used within the mobile communication device, the isolation provided solely by shunts may be limited. For example, as the operating frequency of the device increases, the ability to achieve high levels of isolation using shunts decreases. Although additional, parallel-connected shunts can be added to increase isolation, it has been found that the amount of isolation provided by each additional shunt decreases dramatically, and that additional shunts beyond three are generally ineffective. Furthermore, each additional shunt affects the performance of the switching arm, reducing linearity and degrading the signal, particularly at high frequencies (e.g., above 1 GHz). As a result, the total amount of isolation that can be achieved using the shunt method is limited, particularly at higher frequencies. Switches providing approximately 3-4 dB of isolation may be relatively easy to implement using shunts; however, for a high isolation switch (e.g., greater than 55 dB isolation between arms), a different technique is needed, as discussed further below.

Another type of technology and an alternative to CMOS which may be used in mobile communication devices is pseudomorphic High Electron Mobility Transistors (pHEMT). Typically, the package size of a pHEMT-based device is significantly larger and consequently more expensive than a similar device implemented in CMOS. For example, unlike a CMOS-based device, a pHEMT-based device may be unable to provide integrated control functionality within the device and may require external control circuitry. As a result, the package size of the pHEMT-based device may be relatively large. Therefore, CMOS is generally a preferred technology for mobile communications devices. Although electrical shunts can be used to achieve higher levels of isolation with pHEMT devices than in CMOS devices, the addition of several shunts to obtain a desired level of isolation adds to the already larger size of the pHEMT device, making pHEMT switches undesirable for many mobile communications devices.

Thus, there is a need for a small, relatively inexpensive, CMOS-based RF switch capable of providing very high isolation between different circuits and/or switch arms at high frequencies, while maintaining linearity and limiting noise, interference, and power loss between the switched circuits. Accordingly, aspects and embodiments of the invention are directed to a high isolation switch that incorporates the use of a switched shunt notch filter to provide very high isolation between switching arms.

Figure 2:
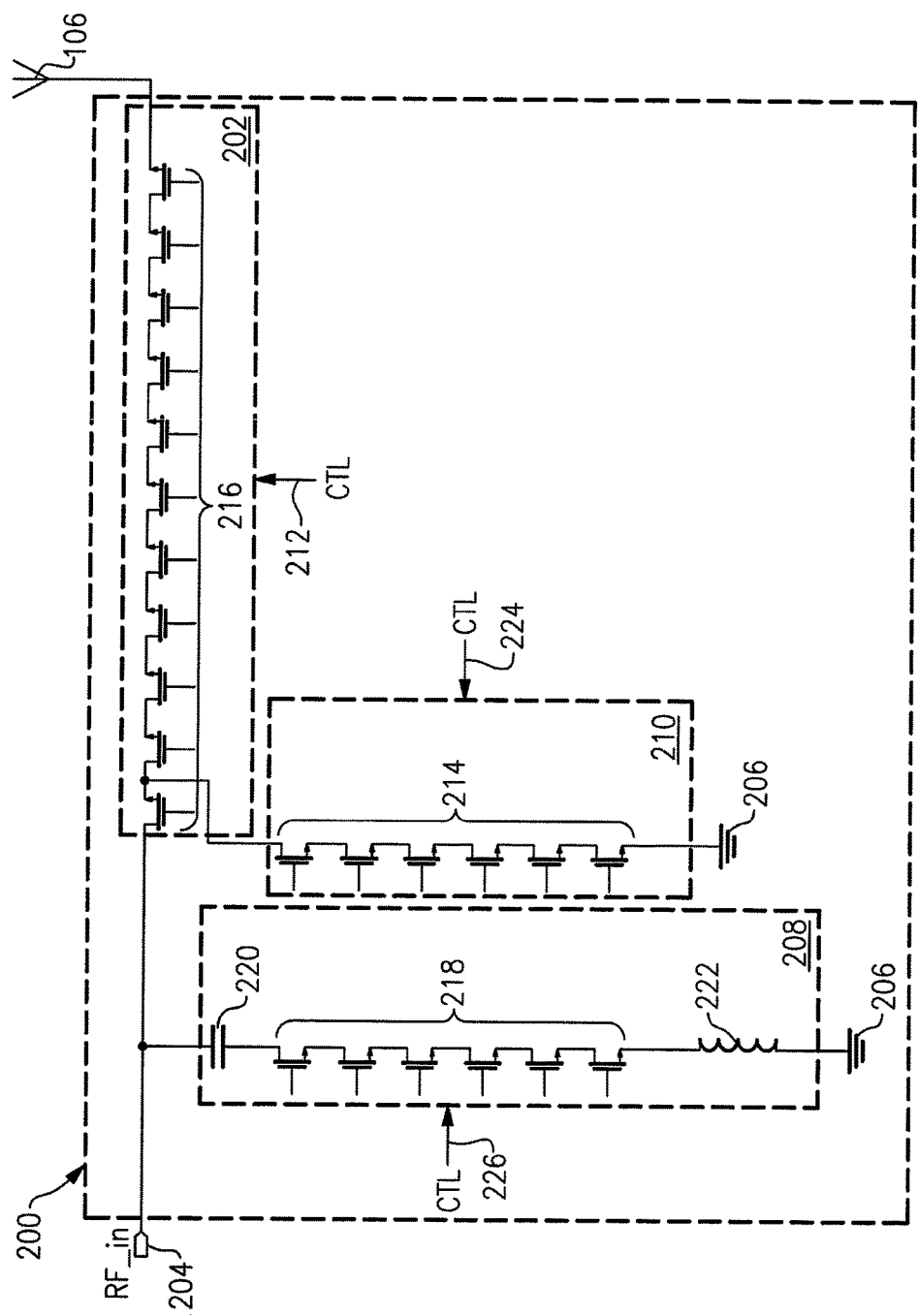
FIG. 2 is a circuit diagram of one example of a switching arm of a non-absorptive, high isolation switch in accordance with aspects of the present invention.

Referring to FIG. 2, there is illustrated one example of a switching arm 200 of a high isolation switch including an LC notch filter in accordance with one embodiment. The switching arm 200 corresponds to either one of the switching arms 102, 104 in FIG. 1A. In the illustrated example, the switching arm 200 is non-absorptive; however, absorptive switches may also be implemented, as discussed further below. The switching arm 200 includes a switch circuit 202 coupled between an input 204 and the antenna 106. The input 204 may be coupled to one of the circuits 112, 116 of FIG. 1A. According to one embodiment, the switch is an RF switch; however, it is to be appreciated that the switch is not limited to the RF or any other particular range of frequencies. The switch circuit 202 comprises a plurality of transistors 216 coupled in series between the input 204 and the antenna 106 which provide the switching function. The plurality of transistors 216 may include any number of transistors, not limited to the number illustrated in FIG. 2. According to one embodiment, when activation of the arm 200 is desired, a control signal 212 (corresponding to control signal 117 or 118 in FIG. 1, for example) is provided to operate the switch circuit 202 to couple the input 204 to the antenna 106. The control signal 212 is provided to the gates of the plurality of transistors 216 to activate the transistors and allow current to flow from the input 204, through the plurality of transistors 216, to the antenna 106. When deactivation of the arm 200 is desired, the control signal 212 is provided to the gates of the plurality of transistors 216 to deactivate the transistors and prevent current flow between the input 204 and the antenna 206.

As discussed above, the switching arm 200 further includes a switchable LC notch filter 208 coupled between the input 204 and ground 206 and situated between the input 204 and the switch circuit 202, as shown in FIG. 2. The switching arm 200 also includes at least one shunt circuit 210 coupled between the input 204 and ground 206, as discussed in more detail below. The LC notch filter 208 in combination with the at least one shunt circuit 210 may provide very high isolation, for example, in excess of 64 dB at 1 GHz, as discussed further below.

According to one embodiment, the at least one shunt circuit 210 includes a plurality of transistors 214 coupled in series between the input 204 and RF ground 206. The plurality of transistors 214 may include any number of transistors, and is not limited to the number shown in FIG. 2. In the illustrated example, the shunt circuit 210 is coupled between the first and second transistors of the switch circuit 202. However, it is to be appreciated that the shunt circuit 210 may be coupled to a different location in the switch circuit 202, and that additional shunts may be included and may be coupled to different points of the switch circuit 202 (e.g. between any two of the plurality of transistors 216).

As discussed above, even when the arm 200 is deactivated, it is possible for noise from arm 200 to interfere with a different, activated arm (not shown). Accordingly, upon deactivation of the arm 200, a control signal 224 is provided the plurality of transistors 214 of the shunt circuit 210 to activate the transistors and allow current to flow from the input 204 to ground 206. By allowing current to flow from the input 204 to RF ground 206, at least a portion of the unwanted noise in the arm 200 may be directed to ground before it can propagate to other circuit components. Upon activation of the arm 200, a control signal 224 is provided to the plurality of transistors 214 to deactivate the transistors and prevent current flow through the shunt circuit 210, thereby allowing the signal from the input 204 to pass to the antenna 106. The control signals 212 and 224 operate in concert, such that when the transistors 216 are active, the transistors 214 are switched OFF, and when the transistors 216 are turned OFF, the transistors 214 are turned ON.

The configuration of shunts within the arm 200 may depend on the type and power level of the signal passing through the switch circuit 202. For example, when the arm 200 is activated and the transistors 214 are deactivated, the transistors 214 of the shunt circuit 210 may be configured to accommodate and maintain the voltage at the input 204 across the shunt circuit 210. To accommodate a signal on the input 204 with a relatively high voltage swing, the number ("stack height") of the transistors 214 may be relatively high to prevent drain-to-source breakdown of the transistors 214 and consequently current flow in the shunt circuit 210 from the input 204 to RF ground 206. For example, assuming a signal on the input 204 has a voltage swing of >30V peak-to-peak and the transistors have a drain-to-source breakdown voltage (BVDSS) of 3V; a stack height of >10 transistors coupled in series may be used to prevent breakdown. Conversely, when the circuit needs only to maintain a signal on the input 204 with a relatively low voltage swing, the stack height of the transistors 214 may be relatively low.

In another embodiment, when the arm 200 is deactivated and the transistors 214 are activated, the transistors 214 may be configured to provide a matching resistance to external circuitry to limit reflections in the arm 200. It is to be appreciated that if the shunt circuit 210 does not provide a low enough resistance to ground or an appropriately matched resistance, the shunt circuit 210 may create "notches" in the insertion loss of the arm 200, meaning that at certain frequencies (in the "notches"), the insertion loss is poor, due to signal reflections. As such, it may be necessary to balance the prevention of drain-to-source breakdown with the prevention of reflections. For instance, in examples where the stack height of the transistors 214 is relatively high to accommodate high signal voltage on the input 204, the width of the transistors 214 may be increased to compensate for the added resistance of the additional transistors and thereby maintain a matching resistance.

As discussed above, in order to provide a switch with high isolation and a relatively small circuit footprint, in one embodiment, a switchable LC notch filter 208 is used to provide further isolation in addition to that provided by the shunt 214. According to one embodiment, the LC notch filter 208 includes a capacitor 220, an inductor 222, and a plurality of transistors 218 coupled in series between the capacitor 220 and the inductor 222, as shown in FIG. 2. The inductor 222 is coupled between the plurality of transistors 218 and ground 206. The LC notch filter 208 has a center resonance frequency, and is designed to pass all frequencies except those within a "notch" (or stop band) centered on a center resonance frequency. Thus, signals at frequencies within the stop band are attenuated. The capacitor 220 and inductor 222 are used to tune the notch filter to the desired operating center resonance frequency. The quality factor (Q) of the LC notch filter 208 is defined as the center frequency of the filter divided by the bandwidth of the filter. The bandwidth is defined as the frequency range between the frequency of the upper 3 dB roll-off point of the filter and the frequency of the lower 3 dB roll-off point of the filter. In other words, the Q factor represents the size (width) of the stop band in relation to the center frequency. The plurality of transistors 218 are used to switch the notch filter 208 ON and OFF and also to set the Q of the filter. When the switching arm 200 is active, a control signal 226 is provided to the gates of the plurality of transistors 218 to turn the notch filter OFF, and when the arm 200 is deactivated the notch filter is turned ON to isolate the deactivated arm. Thus, the control signals 212, 224 and 226 operate in concert such that when the transistors 216 are turned ON, the transistors 214 and 218 are turned OFF and when the transistors 216 are turned OFF, the transistors 214 and 218 are turned ON. The number (stack height) and size of the transistors 218 are selected to accommodate a high signal voltage on the input 204 as discussed above in conjunction with transistors 214, and to achieve a desired Q for the filter 208. Accordingly, it is to be appreciated that the plurality of transistors 218 may include any number of transistors, not limited to the number shown in FIG. 2.

Still referring to FIG. 2, the center frequency of the notch or stop band of the filter 208 is primarily determined by the values of the capacitor 220 and the inductor 222. The level of attenuation provided by the filter to signals within the stop band (i.e., the "depth" of the notch) is determined by the relationship between capacitor 220 and the inductor 222, for a given resistance of the transistors 218. In order to achieve a deep notch, and therefore very high attenuation of signals in the stop band, the values of the capacitor 220 and inductor 222 should be matched, i.e., have approximately the same impedance magnitude. Tuning of the capacitor 220 and inductor 222 values to select both a desired center frequency and notch depth may be achieved by making one or both of the elements variable. For example, according to one embodiment where the value of the capacitor 220 is fixed, the value of the inductor 222 may be tuned or matched with the value of the capacitor 220 to provide the desired notch depth (i.e. desired attenuation) within the stop band of the filter. According to another embodiment where the value of the inductor 222 is fixed, the value of the capacitor 220 may be tuned or matched with the value of the inductor 222 to provide the desired notch depth (i.e. desired attenuation) within the stop band of the filter.

In one embodiment, the inductor 222 is realized using one or more bondwires to ensure a high Q inductor. In particular, the inductor 222 may be implemented as double (parallel) bondwires for repeatability. In these embodiments, the capacitor 220 may be a variable capacitor to allow tuning of the center frequency and/or notch depth of the filter 208. For example, the capacitor 220 may be a variable capacitor, such as a varactor, or may be implemented as a bank of switchable capacitors. Thus, a switchable notch filter with a tunable Q, based on the stack height and size of the switching transistors 218, and a tunable operating frequency and notch depth may be implemented using only a few components, namely an on-chip capacitor 220, a switch (the plurality of transistors 218) and one or more bondwire inductors 222. The notch filter may therefore be very small, but provide very good isolation because the notch can be made very deep. The filter 208 may be tuned based on knowledge of likely frequencies of noise from the other arm of the switch 200 and thus may be configured to attenuate specific frequencies of noise arising in the deactivated arm 200 which would otherwise interfere with signals in the activated arm (not shown) of the switch. In addition, as will be appreciated by those skilled in the art, given the benefit of this disclosure, additional LC notch filters may be included in the switching arm 200, connected in parallel with the notch filter 208, to provide multiple stop bands and therefore wider-band isolation. However, it is also to be appreciated that as additional circuitry is coupled to the input 204, the load characteristics of the line may change. Therefore the level of isolation provided by the arm 200 may need to be balanced with the design specifications of the switch 100.

It is further to be appreciated that in implementation of the switching arm 200, resistors (not shown) may be coupled to each of the transistors 214, 216, 218, 226 illustrated in FIG. 2, as will be understood by those skilled in the art, given the benefit of this disclosure. For example, a resistor may be coupled across the source and drain of each transistor to provide voltage balance while the arm 200 is deactivated. A resistor may also be coupled between a DC gate bias (not shown) and the gate of each transistor to maintain a constant gate to source bias voltage during the transition of the arm 200 from an activated to deactivated state. Additionally, a common resistor may also be used to couple to all of the individual gate resistors to the DC gate bias.

Figure 3:
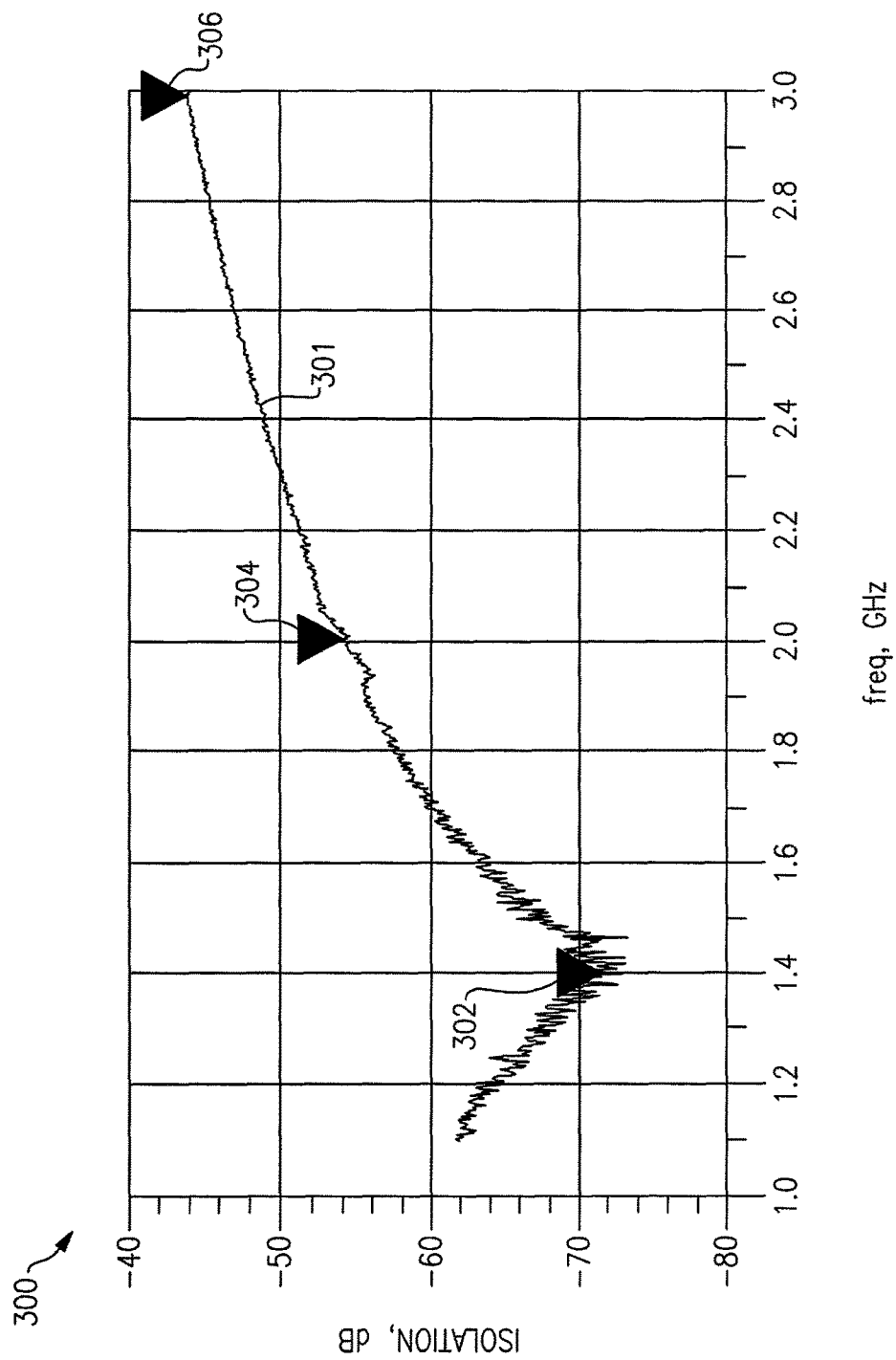
FIG. 3 is a graph illustrating isolation (in dB) provided by an example of the switching arm illustrated in FIG. 2.

Referring to FIG. 3, there is illustrated a graph 300 of isolation (in dB) provided by an example of the switching arm 200 over a range of frequencies from about 1 GHz to 3 GHz. In this example, the switching arm 200 provides greater than 40 dB isolation over the measured frequency range. Table 1 below includes example values of isolation provided between switching arms 200 of an embodiment of the switch as measured at three example frequencies.

TABLE 1

| Reference No. | Frequency (GHz) | Isolation (dB) |
|---|---|---|
| 302 | 1.402 | −71.533 |
| 304 | 2.006 | −54.125 |
| 306 | 2.991 | −43.831 |

The noise that can be seen on trace 301 in FIG. 3, particularly in the vicinity of reference 302, is due to limitations in the printed circuit board on which the test switch was fabricated. In a practical implementation, noise may be due to nonlinear circuits (for example, amplifiers, diodes, etc.) coupled to the input 204. The results illustrated in FIG. 3 provide confirmation that embodiments of the switch incorporating the notch filter 208 discussed above can provide very high levels of isolation at high frequencies. In particular, as demonstrated by the above example, embodiments of the switch can achieve isolation of greater than 60 dB at 1 GHz, 52 dB at 2 GHz and 42 dB at 3 GHz between an activated arm and a deactivated arm of the switch. These levels of isolation are significantly higher than the levels of isolation that can be achieved using only shunts without an LC notch filter.

Figure 4:
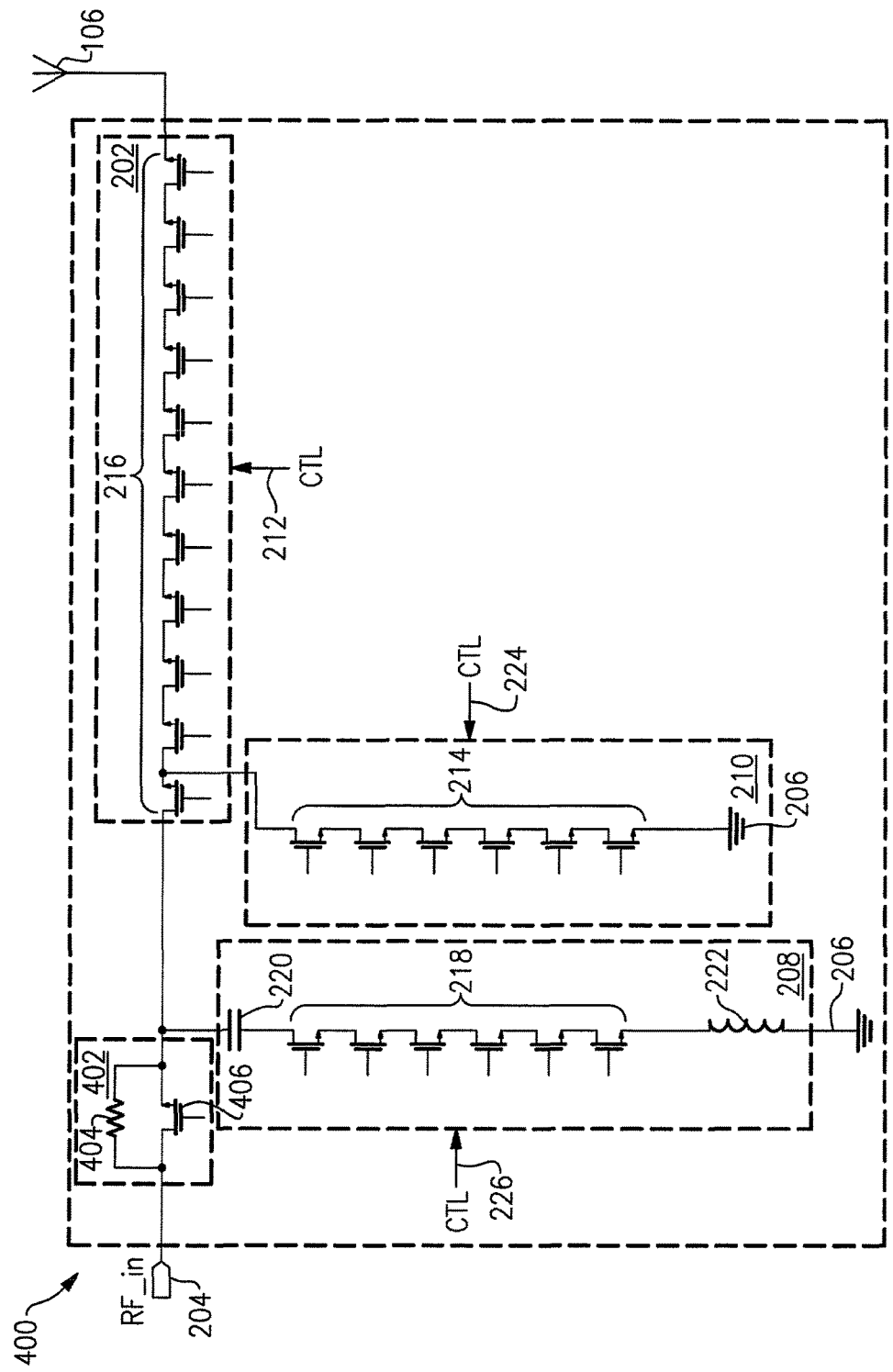
FIG. 4 is a circuit diagram of one example of an absorptive high isolation switch arm in accordance with aspects of the present invention.

As discussed above, embodiments of the switch 100 may be absorptive or non-absorptive. Referring to FIG. 4, there is illustrated an arm 400 of a high isolation absorptive switch in accordance with one embodiment. The switching arm 400 is similar to the non-absorptive switching arm 200 discussed above with reference to FIG. 2, and includes a termination circuit 402. According to one embodiment, the termination circuit 402 includes a resistor 404 and a transistor 406. The value of the resistor 404 may be selected such that the impedance presented to the input 204 by the switching arm 400 is a certain desired value. For example, where the impedance presented by the switching arm 400 is desired to be approximately 50 Ohms, the resistor 404 is a 45 Ohm resistor, accounting for the impedance added by components 202, 208, and 210. However, it is to be appreciated that the resistor value will vary with the desired value of the total impedance of the switching arm 400 and the impedance presented by the components 202, 208, and 210 and therefore the value of the resistor 404 is not limited to 45 Ohms. The transistor 406 is used as a switch to switch the resistor 404 into or out of connection between the input 204 and the switch circuit 202 depending on whether the switching arm 400 is inactive or active, respectively.

Figure 5:
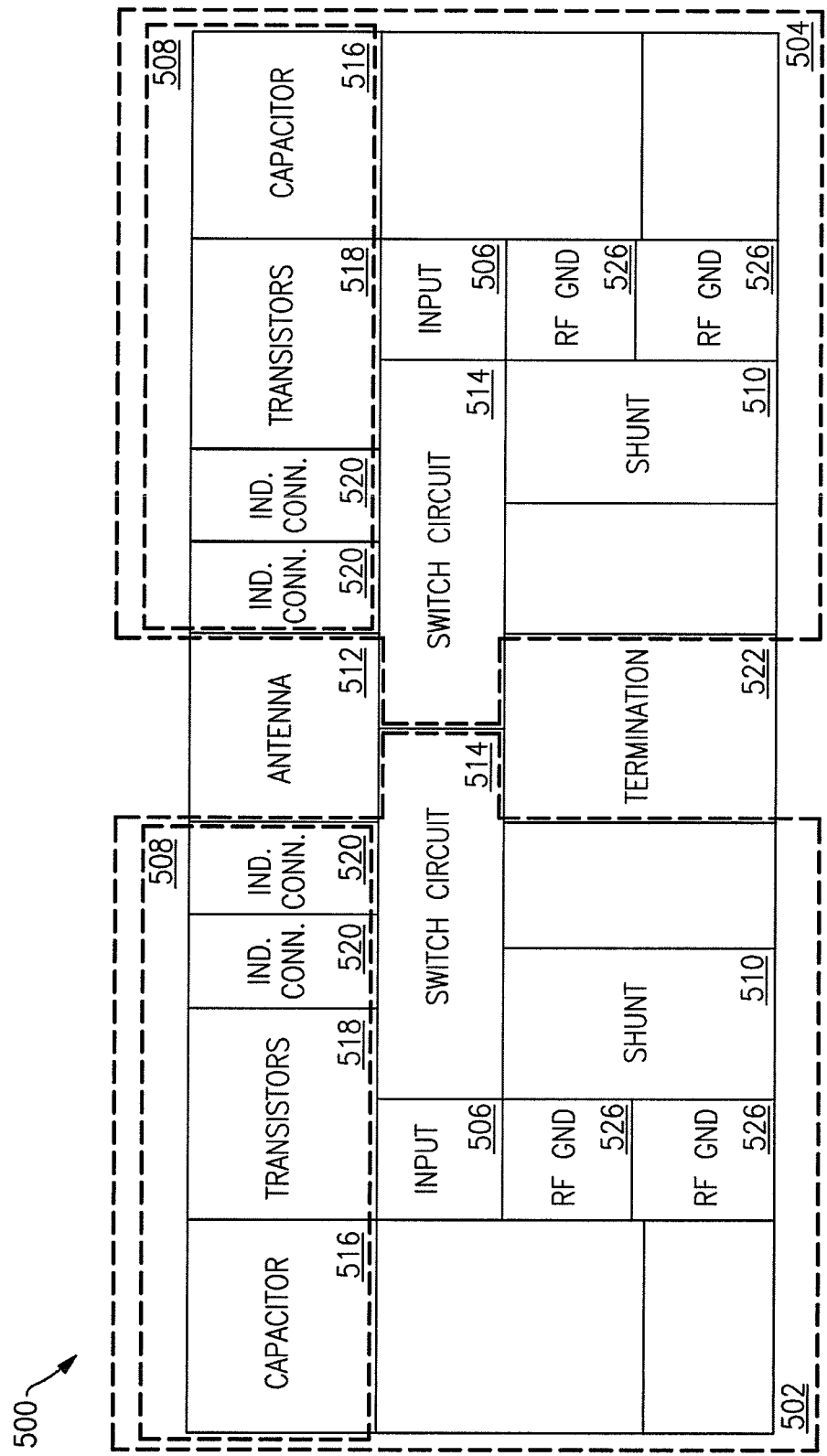
FIG. 5 is a block diagram of one example of a chip layout of a high isolation switch in accordance with aspects of the present invention.

Referring to FIG. 5, there is illustrated a block diagram of one example of an Integrated Circuit (IC) chip layout of a Single Pole Double Throw (SPDT) high isolation switch 500, corresponding to the switch 100 discussed above, in accordance with one embodiment. As discussed above, the SPDT switch 500 includes two arms 502, 504 which are selectively coupled to an antenna connection 512 to which the external antenna 106 may be connected. In examples in which the switch 500 is an absorptive switch, the switch arms 502, 504 are also coupled to a termination circuit 522 corresponding to the termination circuit 108 as discussed above with reference to FIG. 1B.

In the illustrated example, each of the arms 502, 504 includes a switch circuit 514, LC notch filter 508, and at least one shunt circuit 510. The switch 500 further includes input connection pads 506 to receive a signal from circuits 102 and 104 as discussed above with reference to FIGS. 1A and 1B. Each switch circuit 514 corresponds to the switch circuit 202 discussed above, and comprises the plurality of transistors 216 coupled between the respective input connection 506 and antenna connection 512. The shunt circuits 510 each correspond to the shunt circuit 210 discussed above, and are connected between the respective transmit line 506 and ground 526. The LC notch filter 508 corresponds to the LC notch filter 208 as discussed above with reference to FIG. 2 and includes the inductor 222 (not shown in FIG. 5), a capacitor 516, a plurality of transistors 518, and at least one inductor connection 520 to which the inductor 222 may be connected. As discussed above, in one embodiment, the inductor 222 is realized using one or more bondwires coupled to the at least one inductor connection 520. In particular, the inductor 222 may be implemented as a double bondwire for manufacturing repeatability.

Figure 6:
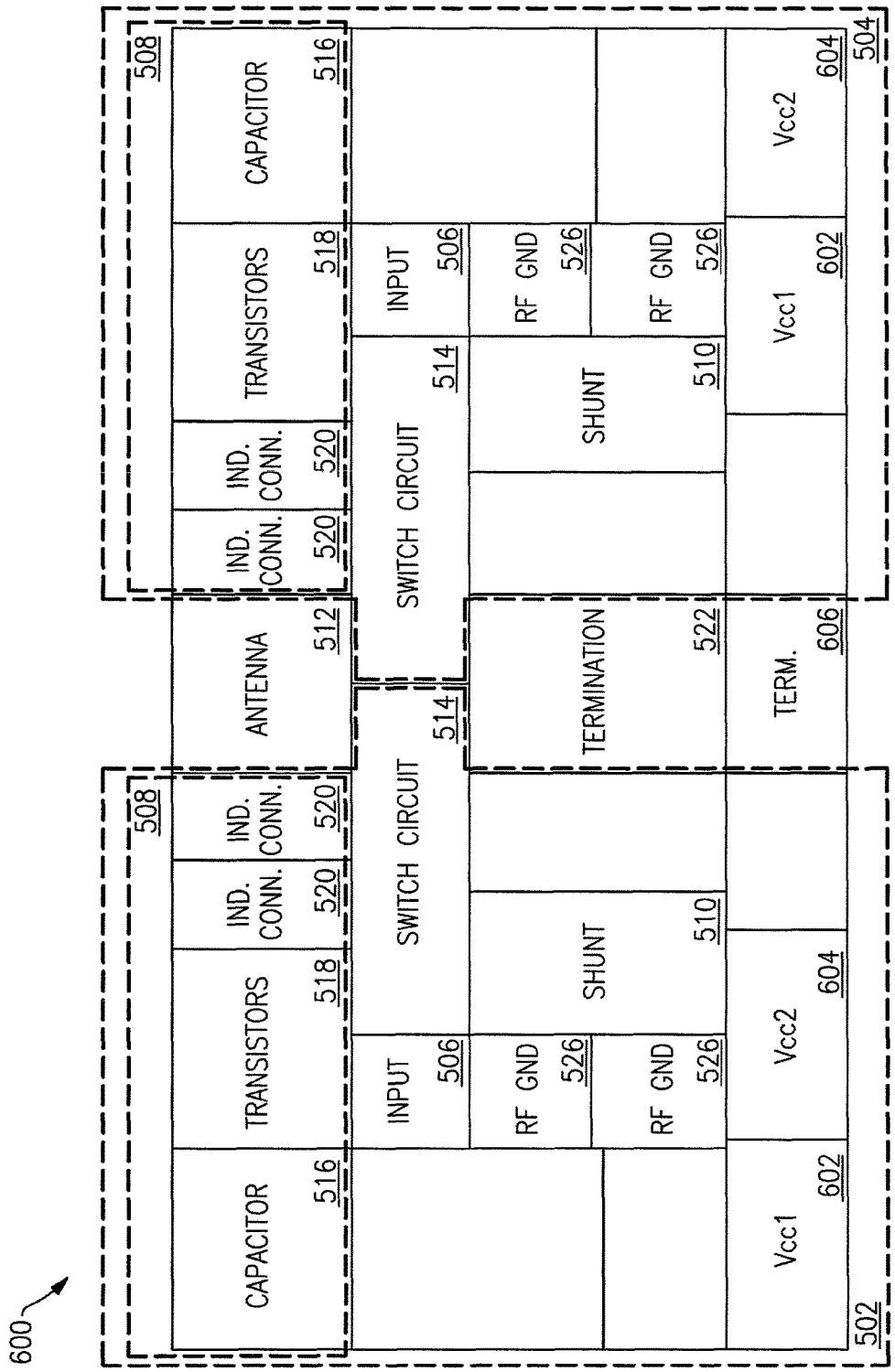
FIG. 6 is a block diagram of another example of a chip layout of a high isolation switch in accordance with aspects of the present invention.

Referring to FIG. 6, there is illustrated a block diagram of another example of an Integrated Circuit (IC) chip layout of an absorptive high isolation switch 600, corresponding to the switch 100 discussed above, in accordance with one embodiment. The switch 600 is comparable to the switch 500 described in relation to FIG. 5, and includes additional DC power supply integration and a termination line connection. According to one embodiment, each arm 502, 504 of the switch 600 includes a first DC power supply input 602 and a second DC power supply input 604. In one example, each DC power supply input 602, 604 may be coupled to an external power supply (not shown) capable of providing DC power to the high isolation switch 600. According to another embodiment in which the switch 600 is an absorptive switch, the switch 600 may also include a termination line connection 606. In this example, the termination line connection 606 is configured to be coupled to an external termination control line (not shown) which is capable of providing control signals to operate the termination circuit 522.

Figure 7:
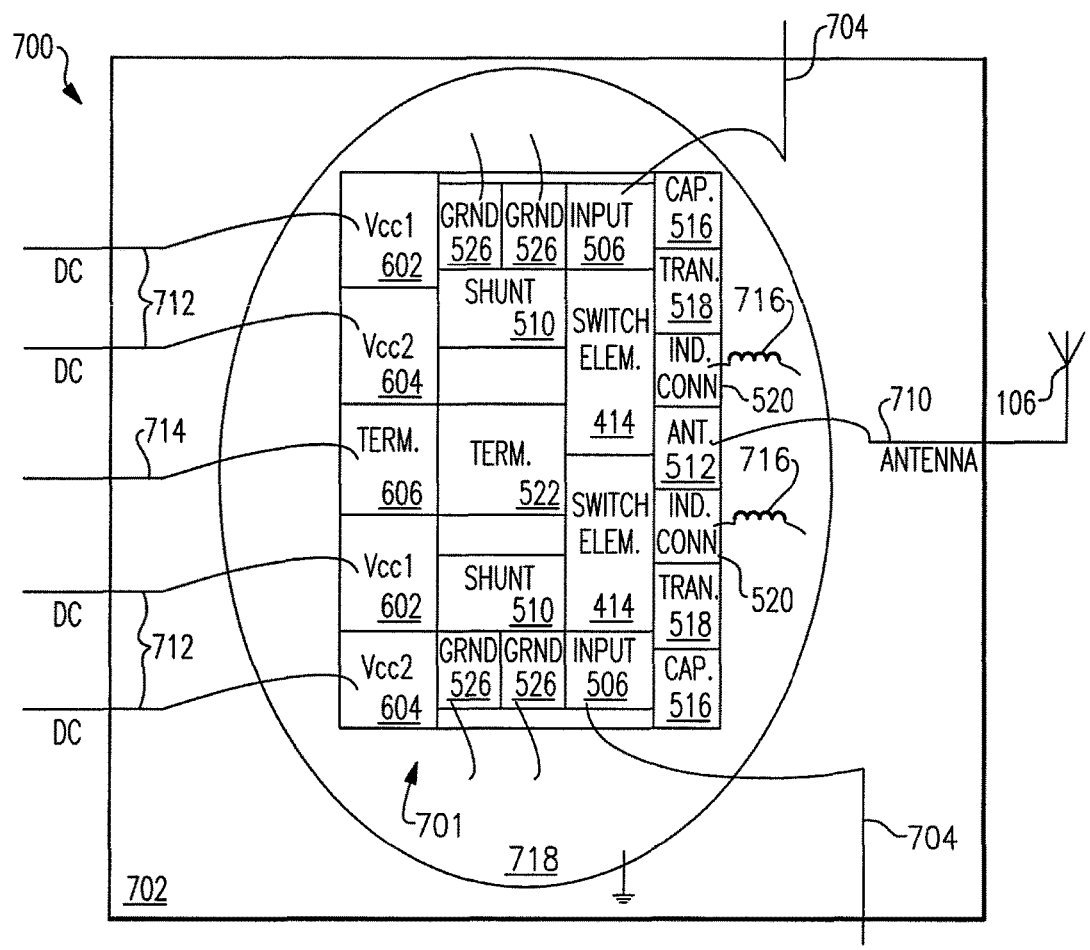
FIG. 7 is a block diagram of one example of a chip layout for a high isolation switch in accordance with aspects of the present invention.

Referring to FIG. 7, there is illustrated a diagram of another example of an Integrated Circuit (IC) chip layout 700 of a high isolation switch 701, corresponding to the switch 100 discussed above, in accordance with one embodiment. The switch 701 is comparable to the switch 600 described with respect to FIG. 6. The chip 700 includes the switch 701 and multiple external connections to a Printed Circuit Board (PCB). For example, in examples where the switch 701 is used to switch between different transmit lines (e.g., from transmitter circuits configured for different frequency bands, as discussed above), each input connection 506 of the switch 701 is coupled to an external transmission line 704 on the PCB 702. Each external transmission line 704 may be coupled to additional external circuitry (not shown) configured to transmit or receive signals from the antenna 106, via the switch 701. The antenna connection 512 is coupled to an antenna line 710 on the PCB 702. The antenna line 710 may be coupled to the external antenna 106 configured to transmit signals from one of the transmission lines 704 via the switch 701 or receive signals to provide to one of the transmission lines 704 via the switch 701.

Each DC power supply input 602, 604 is coupled to a DC power line 712 on the PCB 702. Each DC power line 712 may be coupled to an external DC power source (not shown) configured to provide DC power to the components of the switch 701. According to one embodiment, a first external DC power source (not shown) may be configured to provide a first DC power level to the first DC power supply input 602 and a second external DC power source (not shown) may be configured to provide a second DC power level to the second DC power supply input 604. In examples in which the switch is an absorptive switch, a termination line connection 606 is coupled to a termination control line 714 on the PCB 702. The termination control line 714 may be coupled to external circuitry (not shown) configured to control the operation of the termination circuit 522 for absorptive embodiments of the switch 701.

Still referring to FIG. 7, each of the inductor connections 520 are coupled to a grounded portion 718 of the PCB 720 via a bondwire inductor 716. As illustrated, the switch 701 includes two bondwire inductors 716; however, it should be appreciated that any number of inductors may be used. The bondwire inductors 716 correspond to the inductor 222 of the LC notch filter 208 as discussed above with reference to FIG. 2. A user may adjust the operating frequency and notch depth of the filter 208 by tuning the value of the capacitor 516. Each RF ground 526 of the switch 701 also may be coupled to a grounded portion 718 of the PCB 702. According to one embodiment, the multiple external connections of the switch 701 may be coupled to the PCB via a Multi-Chip Module (MCM).

As described herein, the components of the high isolation switch of the current invention are CMOS devices. However, it is to be appreciated that the high isolation switch of the current invention may be developed using other types of mobile communication technology, such as, for example, pHEMT.

As described herein, the high isolation switch of the current invention is utilized as a single pole, double throw (SPDT) switch with two arms. However, it should be appreciated that the high isolation switch of the current invention may be utilized as any type of switch. For example, the high isolation switch may be configured as a single pole, single throw switch (SPST) with one arm, a double pole, single throw switch (DPST) with two arms, a double pole, double throw switch (DPDT) with four arms, a single pole, twelve throw switch (SP12T) with twelve arms, or numerous other configurations, as will be recognized by those skilled in the art, given the benefit of this disclosure. The high isolation switch may be configured to select between many different types of circuits and/or transmission lines. For example, as discussed above, the switch may be used to select between different transmit lines, different receive (Rx) lines, or a combination of transmit and receive lines.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accord- ingly, the foregoing description and drawings are by way of example only, and the scope of the invention should be determined from proper construction of the appended claims, and their equivalents.

What is claimed is:

1. A high isolation radio frequency (RF) switch comprising:
   an input;
   an output;
   a switching circuit coupled in series between the input and the output, the switching circuit configured, in a first mode of operation, to selectively couple the input to the output responsive to a first control signal and, in a second mode of operation, to decouple the input from the output responsive to a second control signal;
   at least one shunt circuit coupled between the switching circuit and ground; and
   at least one LC notch filter switchably coupled to the input in a shunt configuration and including a series combination of at least one capacitor, at least one inductor, and a switch including a plurality of series connected transistors, the at least one LC notch filter configured, in the first mode of operation, to be decoupled from the input, and in the second mode of operation, to be coupled to the input and to attenuate signals at the input within a stop band range of frequencies.

2. The high isolation RF switch as claimed in claim 1 wherein the at least one capacitor is connected in series between the switch and the input, and the at least one inductor is connected in series between the switch and ground.

3. The high isolation RF switch of claim 1 wherein the switching circuit includes at least one transistor coupled in series between the input and the output, the at least one transistor configured to selectively couple the input to the output, in the first mode of operation, responsive to the first control signal.

4. The high isolation RF switch of claim 1 wherein the high isolation RF switch is an absorptive switch including a termination circuit selectively coupled in series between the input and the switching circuit.

5. The high isolation RF switch of claim 4 wherein the termination circuit includes at least one resistor and at least one transistor the at least one transistor of the termination circuit configured to selectively couple the resistor into and out of connection between the input and the switching circuit.

6. The high isolation RF switch of claim 1 wherein the shunt circuit includes at least one transistor coupled in series between the switching circuit and ground the at least one transistor configured to selectively couple the switching circuit to ground responsive to a shunt control signal.

7. The high isolation RF switch of claim 1 wherein the at least one inductor includes at least one bondwire inductor.

8. The high isolation RF switch of claim 1 wherein the at least one capacitor includes one of a variable capacitor and a switchable bank of capacitors.

9. The high isolation RF switch of claim 1 wherein the value of the at least one capacitor and the value of the at least one inductor are matched.

10. A radio frequency (RF) device comprising:
    a first RF transmission line;
    a second RF transmission line;
    an output;
    a first switching arm coupled between the output and the first RF transmission line, the first switching arm configured to selectively couple the first RF transmission line to the output for a first mode of operation of the RF device;
    a second switching arm coupled between the output and the second RF transmission line, the second switching arm configured to selectively couple the second RF transmission line to the output for a second mode of operation of the RF device; and
    a first LC notch filter switchably coupled to the first switching arm in a shunt configuration, the first LC notch filter configured, in the second mode of operation of the RF device, to be coupled to the first switching arm and to attenuate signals at the first switching arm within a first range of frequencies, the first range of frequencies being selected to include noise frequencies in the first switching arm generated by the second switching arm during the second mode of operation of the RF device, and the first LC notch filter configured, in the first mode of operation of the RF device, to be decoupled from the first switching arm such that signals of all frequencies can pass from the first RF transmission line to the first switching arm.

11. The RF device of claim 10 further comprising at least one shunt circuit coupled between the first switching arm and ground.

12. The RF device of claim 11 wherein the at least one shunt circuit includes at least one transistor coupled in series between the first switching arm and ground, the at least one transistor configured to couple the first switching arm to ground in the second mode of operation of the RF device, responsive to a control signal.

13. The RF device of claim 10 wherein the first LC notch filter includes a series combination of a first capacitor, a first inductor, and at least one first transistor.

14. The RF device of claim 13 wherein the first inductor includes at least one bondwire inductor.

15. The RF device of claim 13 wherein the first capacitor includes one of a variable capacitor and a switchable bank of capacitors.

16. The high isolation RF switch of claim 1 wherein the at least one LC notch filter is further configured, in the first mode of operation, to be decoupled from the input such that signals of all frequencies can pass from the input to the switching circuit.

17. The RF device of claim 13 wherein the at least one first transistor is configured to activate the first LC notch filter in the second mode of operation of the RF device and the first range of frequencies is determined by a value of the first capacitor and a value of the first inductor.

18. The RF device of claim 10 wherein the first switching arm is an absorptive switching arm including a termination circuit selectively coupled in series between the first RF transmission line and the first switching arm.

19. The RF device of claim 10 further comprising a second LC notch filter switchably coupled to the second switching arm in a shunt configuration, the second LC notch filter configured to attenuate signals at the second switching arm within a second range of frequencies, the second range of frequencies being selected to include noise frequencies in the second switching arm generated by the first switching arm during the first mode of operation of the RF device.

20. The RF device of claim 19 wherein the first RF transmission line is configured to transmit signals to the output, via the first switching circuit, in the first mode of operation of the RF device, and the second RF transmission line is configured to receive signals from the output, via the second switching circuit, in the second mode of operation of the RF device.

21. The RF device of claim 19 wherein the first RF transmission line is configured to carry GSM signals in the first mode of operation of the RF device, and the second RF transmission line is configured to carry CDMA signals in the second mode of operation of the RF device.

22. The RF device of claim 17 wherein the value of the first capacitor and the value of the first inductor are matched.

23. The RF device of claim 19 wherein the second LC notch filter includes a series combination of a second capacitor, a second inductor, and at least one second transistor.

24. The RF device of claim 23 wherein the at least one second transistor is configured to activate the second LC notch filter in the first mode of operation of the RF device and the second range of frequencies is determined by a value of the second capacitor and a value of the second inductor.

25. The high isolation RF switch of claim 1 wherein the stop band range of frequencies is determined by a value of the at least one capacitor and a value of the at least one inductor.

* * * * *